United States Patent Office 3,810,982
Patented May 14, 1974

3,810,982
INSECTICIDAL PHOSPHONYL CYANODITHIO-IMIDO CARBONATES
Arnold D. Gutman, Berkeley, Calif., assignor to Stauffer Chemical Company, New York, N.Y.
No Drawing. Continuation of abandoned application Ser. No. 13,857, Feb. 24, 1970. This application Oct. 2, 1972, Ser. No. 294,138
Int. Cl. A01n 9/36
U.S. Cl. 424—210  12 Claims

ABSTRACT OF THE DISCLOSURE

Novel phosphoryl cyanodithioimido carbonates are disclosed. The compounds are useful as insecticides, particularly as soil insecticides.

BACKGROUND OF THE INVENTION

This is a continuation of application Ser. No. 13,857, filed Feb. 24, 1970, now abandoned. This invention relates to novel compositions of matter and their use as insecticides. More particularly, this invention relates to compounds having the formula

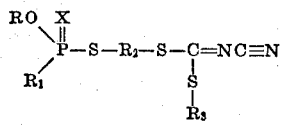

wherein R is alkyl of 1 through 5 carbon atoms; $R_1$ is selected from the group consisting of alkyl containing 1 through 5 carbon atoms, and alkoxy containing 1 through 5 carbon atoms; X is selected from the group consisting of O and S; $R_2$ is alkylene containing 1 through 4 carbon atoms, $R_3$ is selected from the group consisting of alkyl of 1 through 4 carbon atoms, haloalkyl containing 1 through 4 carbon atoms, alkenyl of 2 through 4 carbon atoms, haloalkenyl containing 2 through 4 carbon atoms, benzyl, halobenzyl, and $R_4$—S—$R_5$ wherein $R_4$ is alkyl containing 1 through 4 carbon atoms, haloalkyl containing 1 through 4 carbon atoms, and $R_5$ is selected from the group consisting of —$CH_2$— and —$C_2H_4$—. The term "halo" used in describing the present invention encompasses the moieties chloro-, bromo-, iodo-, and fluoro-, and includes poly- as well as mono-substitution.

The invention also comprises the use of materials having the above-described formula in novel insecticidal compositions and methods. In particular, the compositions of the invention are especially effective as soil insecticides and fumigants.

In a preferred form, the invention relates to compositions and their use as insecticides having the formula

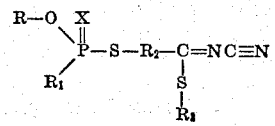

wherein R is selected from the group consisting of methyl and ethyl; $R_1$ is selected from the group consisting of methyl, ethyl, methoxy, and ethoxy; X is selected from the group consisting of O and S; $R_2$ is alkylene of 1 through 4 carbon atoms, and $R_3$ is selected from the group consisting of methyl, ethyl, alkenyl of 2 through 4 carbon atoms, mono- and di- haloalkenyl containing 2 through 4 carbon atoms, and $R_4$—S—$R_5$ wherein $R_4$ is selected from the group consisting of methyl and ethyl, and $R_5$ is selected from the group consisting of —$CH_2$— and —$CH_2CH_2$—. In its most preferred form, the invention comprises compositions of the preferred formula wherein X is S and $R_2$ is selected from the group consisting of —$CH_2$—, —$CH_2CH_2$—, and the use of these materials as insecticides.

In general, the method of the invention comprises contacting the insects or a locus to be protected (such as soil) with an effective or insecticidal amount of a composition having the formula above indicated.

DETAILED DESCRIPTION OF THE INVENTION

Broadly, the compounds of the invention may be prepared according to the following general reactions:

STEP 1

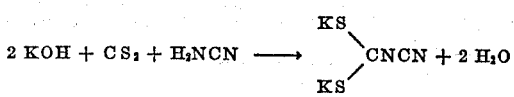

STEP 2

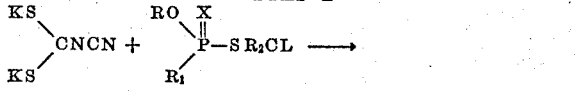

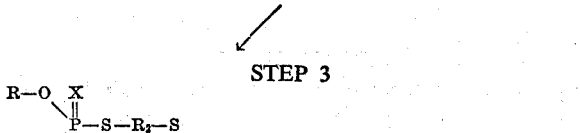

STEP 3

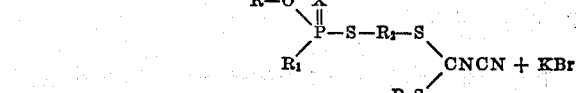

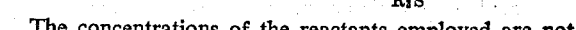

The concentrations of the reactants employed are not particularly critical, although stoichiometry requires, e.g., in Step 1, that about two mols of KOH be employed per mol of $H_2NCN$ and $CS_2$. Again, bases other than KOH may be employed, such as NaOH or LiOH. In Step 3, other halides, such as $R_3Cl$ or $R_3I$ may be employed.

The first step is conducted in water and the subsequent steps are preferably carried out in a solvent such as acetone, dioxane, or DMF or DMSO. Step 1 is preferably carried out at a temperature of from about 10° C. to 25° C., Step 2 is carried out at temperatures of from about 50° C. to about 100° C., while Step 3 is carried out at a temperature of from about 25° C. to about 35° C.

The following examples are provided to demonstrate more fully the preparation of the compounds of the invention. The nomenclature employed is consistent with that used by Timmons, et al., Journal of Organic Chemistry, vol. 32, pages 1566–1572.

EXAMPLE I

Preparation of allyl-(O,O-diethylphosphorodithioylmethyl) cyanodithioimido carbonate Steps 1 and 2.—Approximately 8.4 g. (0.2 mol) dissolved in 15 ml. of ethyl alcohol and 13.4 ml. of $CS_2$ (0.22 mol) are added to a five hundred milliliter flask. The mixture and flask are cooled in an ice bath and 14.5 grams of 85 percent KOH in 35 ml. of ethyl alcohol are added to the flask with stirring. Upon crystallization 0.05 mole of the product, dipotassium cyanodithioimido carbonate is combined with 150 ml. of dimethyl formamide in a flask. The mixture is stirred, and 1.7 grams (0.05 mol) of S-chloromethyl-O,O-diethylphosphorodithioate is added. Stirring is continued for about three hours at 60° C. then the mixture containing the potassium (O,O-diethylphosphorodithioylmethyl)cyanodithioimido carbonate is allowed to come to room temperature.

Step 3.—At this point, about 6.05 grams (0.05 mol) of allyl bromide is then added directly to the mixture obtained in Step 1, and the resultant mixture is stirred for about three hours at room temperature. Three hundred milliliters of benzene is then added, and the mixture is washed with three 150 ml. portions of $H_2O$. The benzene phase is dried with anhydrous magnesium sulfate and evaporated under reduced pressure to obtain O,O-diethylphosphorodithioylmethyl, allyl cyanodithioimido carbonate. $N_D^{30}=1.5637$

EXAMPLE II

Preparation of O,O-diethylphosphorodithioylethyl, allyl cyanodithioimido carbonate The procedure of Example I is repeated except that S-($\beta$ - chloroethyl)O,O-diethylphosphorodithioate is employed instead of the S-chloromethyl O,O-diethylphosphorodithioate. $N_D^{30}=1.5530$

EXAMPLE III

Preparation of O,O-diethylphosphorothioylmethyl, allyl cyanodithioimido carbonate The procedure of Example I is repeated, except that S-chloromethyl O,O-diethylphosphorothioate is employed instead of the S-chloromethyl O,O-diethylphosphonodithioate.

EXAMPLE IV

Preparation of O,O-diethylphosphorodithioyl ethyl, methylthiomethyl cyanodithioimido carbonate The procedure of Example I is repeated except that $CH_3SCH_2Cl$ is employed instead of the allyl bromide, and S-($\beta$ - chloroethyl)-O,O-diethylphosphorodithioate is employed instead of the S-chloromethyl-O,O-diethylphosphorodithioate.

EXAMPLE V

Preparation of O,O-diethylphosphorodithioylmethyl, methylthiomethyl cyanodithioimido carbonate The procedure of Example I is repeated, except that $CH_3SCH_2I$ is employed instead of the allyl bromide. $N_D^{30}=1.5783$

EXAMPLE VI

Preparation of O,O-diethylphosphorodithioylmethyl, 4-chlorobenzyl cyanodithioimido carbonate The procedure of Example I is repeated, except that p-chlorobenzyl chloride is employed instead of the allyl bromide. $N_D^{30}=1.6195$ Compounds which may be prepared according to the invention including the following:

1. O,O-diethylphosphorodithioylmethyl, allyl cyanodithioimido carbonate
2. O,O-diethylphosphorodithioylmethyl, methyl cyanodithioimido carbonate
3. O1ethyl, ethylphosphonodithioylmethyl, methylthiomethyl cyanodithioimido carbonate
4. O-ethyl,ethylphosphonothioylethyl, P-chlorobenzyl cyanodithioimido carbonate
5. O,O-diethylphosphorodithioylethyl, allyl cyanodithioimido carbonate
6. O-methyl, methylphosphonothioylethyl, propyl cyanodithioimido carbonate
7. O-isobutyl, ethylphosphorodithioylpropyl, O-chlorobenzyl cyanodithioimido carbonate
8. O,O-diisopropylphosphorodithioylallyl, ethylthiomethyl cyanodithioimido carbonate
9. O,O-diethylphosphorothioylmethyl, allyl cyanodithioimido carbonate
10. O,O-dipropylphosphorothioylmethyl, butyl cyanodithioimido carbonate
11. O,O-diethylphosphorodithioylmethyl, benzyl cyanodithioimido carbonate
12. O,O-diethylphosphorodithioylmethyl, 2-chlorobenzyl cyanodithioimido carbonate
13. O,O-diethylphosphorodithioylmethyl, methylthiomethyl cyanodithioimido carbonate
14. O,O-diethylphosphorodithioylmethyl, P-bromobenzyl cyanodithioimido carbonate
15. O-isobutyl, methylphosphonodithioylethyl, butenyl-2 cyanodithioimido carbonate
16. O,O-diethylphosphorodithioylpropyl, methylthiomethyl cyanodithioimido carbonate
17. O,O-diethylphosphorodithiomethyl, P-chlorobenzyl cyanodithioimido carbonate
18. O,O-diethylphosphorodithioylmethyl, 2,4-dichlorobenzyl cyanodithioimido carbonate
19. O,O-diethylphosphorodithioylmethyl, 1,1-dichloroallyl cyanodithioimido carbonate
20. O,O-diethylphosphorodithioylethyl, methyl cyanodithioimido carbonate
21. O,O-methylethylphosphorodithioylmethyl, allyl cyanodithioimido carbonate.

In order to demonstrate usefulness, the following tests were conducted using the compounds designated at 1, 2, 4, 5, 13, 17, 19, 20, and 21 in the above list as exemplary of the compounds of the invention.

I. House fly [*Musca domestica* (L.)]

A. Film residue.—A stock solution containing 100 $\mu$g./ml. of the toxicant in an appropriate solvent, e.g. acetone, was prepared. Aliquots of this solution are combined with one ml. of an acetone-peanut oil solution in a dish, 55 mm. in diameter, and allowed to dry. The aliquots were varied to achieve desired toxicant concentrations ranging from 100 $\mu$g. per dish to that at which 50% mortality was obtained. The dishes were placed in a circular cardboard cage, closed on the bottom with cellophane, and covered on top with cloth netting. Twenty-five female house flies were introduced into the cage and the percent mortality was recorded after 48 hours. The LD–50 values are expressed in terms of $\mu$g. per 25 female flies. The results of this test are given in the table below under "HF."

B. Fumigant test.—A stock solution is prepared as in the film residue test (I–A). A piece of filter paper is placed on the bottom of a dish and the toxicant and acetone-peanut oil solutions are pipetted onto the paper. A piece of netting is inserted into the cage above the dish to insure that the house flies do not come into direct contact with the toxicant and both ends of the cardboard cage are sealed with cellophane to prevent escape vapors. The concentration and number of flies placed in the cage are identical to test I-A. The LD–50 value after 48 hours is expressed in $\mu$g. per 285 cc. (the volume of the cage). The results are given in the table below under "Fum."

C. Soil insecticide Evaluation.—Aliquots of a solvent solution of the toxicant are incorporated into one pound of moist sandy loam soil at concentrations ranging from 10 p.p.m. to that at which 50% mortality is obtained. Twenty-five five-day-old house fly larvae are introduced into the treated soil. After 48 hours the larvae or pupae are retrieved from the soil and placed on moistened filter paper in a petri dish until the adult flies have emerged from the pupal cases. Mortality is determined by the percentage of adult flies failing to emerge from the 25 pupae in each dish. LD–50 values are in terms of parts per million of toxicant per pound of soil. The results are listed in the table under "SI."

II. German cockroach [*Blatella germanica* (Linné)]

Ten approximately one-month old nymphs of the German cockroach were placed in a circular cardboard cage sealed on one end with cellophane and covered by cloth netting on the other. Aliquots of the toxicant, dissolved in an appropriate solvent, were diluted in water to which had been added 0.002% of a conventional wetting agent Sponto 221 (a polyoxy-ethylene sorbitan monolaurate ether of alkylated phenol blended with organic sulfonate). Test concentrations ranged from 0.1% downward to that at which 50% mortality is obtained. Each of these aqueous suspensions were sprayed onto the insects, through the cloth netting, by means of a hand-spray gun. Percent mortality in each case was recorded after 72 hours, and the LD-50 values expressed as percent of toxicant in the aqueous spray were recorded. The results are listed in the table under the column "GR."

III. Lygus bug [*Lygus hesperus* (Knight)]

The procedure involved in this test was essentially the same as that employed for the German cockroach test, except that the test concentrations ranged from 0.05% to that at which 50% mortality was obtained. The results are listed in the table under LB.

IV. Salt-marsh caterpillar [*Estigmene acrea* (Drury)]

Test solutions were prepared in a similar manner and at similar concentrations to those employed in testing the German cockroach. Sections of bitter dock (*Rumex obtusifolius*) leaves, 1-1.5 inches in length were immersed in the test solutions for 10-15 seconds and were placed on a wire screen to dry. The dried leaf was then placed on a moistened piece of filter paper in a petri dish and infested with five third-instar larvae. Mortality of the larvae was recorded after 72 hours, and the LD-50 values are expressed as percent active ingredient in the aqueous suspensions. The results are reported in the table below in the column designated "SMC."

V. Black bean aphid [*Aphis fabae* (Scop.)]

Nasturtium (Tropaeolum sp.) plants, approximately 2-3 inches tall, are transplanted into sandy loam soil in 3 inch clay pots and infested with 50-75 aphids of mixed ages. Twenty-four hours later they are sprayed, to the point of runoff, with aqueous suspensions of the toxicant. The suspensions are prepared as in previously described tests (II, III, and IV). Test concentrations ranged from 0.05% to that at which 50% mortality is obtained. Mortality is recorded after 48 hours and the LD-50 values are expressed as percent active ingredient in the aqueous suspension. The results are indicated in the table under the heading "BA."

TABLE I

| Code | HF, µg. | FUM, µg. | SI p.p.m. | Percent GR | LB | BA | SMC |
|---|---|---|---|---|---|---|---|
| 1 | 30 | 8 | 0.5 | >.1 | .05 | .03 | .05 |
| 2 | 60 | 8 | 3 | >.1 | .05 | .05 | .05 |
| 4 | 30 | 30 | | >.1 | .03 | .008 | >.1 |
| 5 | >100 | 70 | 3 | >.1 | >.05 | >.05 | >.1 |
| 13 | 60 | 9 | 0.8 | >.1 | .05 | .03 | .03 |
| 17 | >100 | | | | | >.05 | >.1 |
| 19 | 0 | 30 | 0.8 | >.1 | .03 | .008 | >.1 |
| 20 | 30 | 6 | 0.3 | >.1 | .03 | >.05 | >.1 |
| 21 | 30 | 30 | 5 | >.1 | .03 | .003 | >.1 |

As can be seen by the test results, the compounds of the invention are useful in killing insects, and are particularly valuable as soil insecticides and fumigants. The compounds may be applied directly to the insects or may be applied to a locus to be protected. In either event, it is, of course, necessary that the insects receive an effective or insecticidal dosage or amount, i.e., an amount sufficient to kill the insects. Since the amount of active agent required will vary according to the insects treated, precise limits on the amounts employed cannot be given. The tests set forth above indicate exemplary amounts which may be employed, as will readily be appreciated by those of skill in the art. Determination of the optimum effective concentration for a specific application is readily conducted by routine procedures, as will also be apparent to those skilled in the art.

The compounds are normally employed with a suitable carrier and may be applied as a dust, spray, drench, or aerosol. The compounds thus may be applied in combination with solvents, diluents, various surface active agents (for example detergents, soaps or other emulsifying or wetting agents, surface active clays) carrier media, adhesives, spreading agents, humectants and the like. They may also be combined with other biologically active compositions, including fungicides, bactericides, and algacides, other molluscicides, etc., as well as with fertilizers, soil modifiers, etc. The compounds of the invention may be used in combination with an inert carrier and a surface active or emulsifying agent, and may also be applied in combination with other biologically active materials, in conjunction with a carrier and a surface active or emulsifying agent. The solid and liquid formulations can be prepared by any of the conventional methods well-known by those skilled in the art. The compositions may be applied to or in textiles, leather, paint, soaps, paper, wood plastic, oil, and other substances.

Various changes and modifications may be made without departing from the spirit and the scope of the invention described herein, as will be apparent to those skilled in the art to which it pertains.

What is claimed is:

1. An insecticidal composition comprising an insecticidally effective amount of a compound having the formula

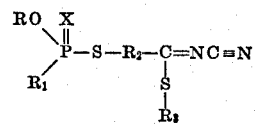

wherein R is selected from the group consisting of methyl and ethyl; $R_1$ is selected from the group consisting of methyl, ethyl, methoxy and ethoxy; X is selected from the group consisting of O and S; $R_2$ is alkylene of 1 through 4 carbon atoms; and $R_3$ is selected from the group consisting of methyl, ethyl, alkenyl of 2 or 3 carbon atoms, and $R_4$—S—$R_5$ wherein $R_4$ is selected from the group consisting of methyl and ethyl, and $R_5$ is selected from the group consisting of —$CH_2$— and —$CH_2CH_2$—, and an inert carrier.

2. The composition of claim 1 wherein X is S and $R_2$ is selected from the group consisting of —$CH_2$—, —$CH_2CH_2$—.

3. The composition of claim 1 wherein R is ethyl; $R_1$ is ethoxy; $R_2$ is —$CH_2$—; X is S; and $R_3$ is methyl.

4. The composition of claim 1 wherein R is ethyl; $R_1$ is ethoxy; $R_2$ is —$CH_2$—; X is S; and $R_3$ is allyl.

5. The composition of claim 1 wherein R is ethyl; $R_1$ is ethoxy; X is S; $R_2$ is —$CH_2$—; and $R_3$ is $CH_3SCH_2$—.

6. The composition of claim 1 wherein R is ethyl; $R_1$ is ethyl; X is S; $R_2$ is —$CH_2CH_2$; and $R_3$ is methyl.

7. A method of killing insects comprising applying to the insects or a locus to be protected an insecticidally effective amount of a compound having the formula

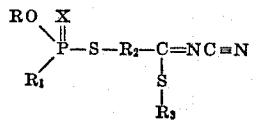

wherein R is selected from the group consisting of methyl and ethyl; $R_1$ is selected from the group consisting of methyl, ethyl, methoxy and ethoxy; X is selected from the group consisting of O and S; $R_2$ is alkylene of 1 through 4 carbon atoms; and $R_3$ is selected from the group consisting of methyl, ethyl, alkenyl of 2 or 3 carbon atoms, and $R_4$—S—$R_5$ wherein $R_4$ is selected from the group consisting of methyl and ethyl, and $R_5$ is selected from the group consisting of —$CH_2$— and —$CH_2CH_2$—.

8. The method of claim 7 wherein X is S and $R_2$ is selected from the group consisting of —$CH_2$— and —$CH_2CH_2$—.

9. The method of claim 7 wherein R is ethyl; $R_1$ is ethoxy; $R_2$ is —$CH_2$—, X is S; and $R_3$ is methyl.

10. The method of claim 7 wherein R is ethyl; $R_1$ is ethoxy; $R_2$ is —$CH_2$—; X is S; and $R_3$ is allyl.

11. The method of claim 7 wherein R is ethyl; $R_1$ is ethoxy; X is S; $R_2$ is —$CH_2$—; and $R_3$ is $CH_3SCH_2$—.

12. The method of claim 7 wherein R is ethyl; $R_1$ is ethyl; X is S; $R_2$ is —$CH_2CH_2$—; and $R_3$ is methyl.

References Cited
UNITED STATES PATENTS
3,379,795   4/1968   Schmidt _____ 424—210
3,408,425   10/1968  Schicke et al. _____ 424—210

VINCENT D. TURNER, Primary Examiner

U.S. Cl. X.R.

260—940

UNITED STATES PATENT AND TRADEMARK OFFICE
CERTIFICATE OF CORRECTION

PATENT NO. : 3,810,982
DATED : May 14, 1974
INVENTOR(S) : Arnold D. Gutman

It is certified that error appears in the above–identified patent and that said Letters Patent are hereby corrected as shown below:

Column 3, line 2, "1.7 grams" should read "11.7 grams".

Column 3, line 64, should read "3. O-ethyl,---".

Column 4, line 29, the word "at" should read "as".

Column 6, line 51, should read --- —$CH_2$—, and---.

Signed and Sealed this ninth Day of December 1975

[SEAL]

Attest:

RUTH C. MASON
Attesting Officer

C. MARSHALL DANN
Commissioner of Patents and Trademarks